UNITED STATES PATENT OFFICE.

THEODOR DIEHL, OF BERLIN, GERMANY, ASSIGNOR TO THE ACTIEN-GESELLSCHAFT FÜR ANILIN FABRIKATION, OF SAME PLACE.

BLUE-BLACK DYE.

SPECIFICATION forming part of Letters Patent No. 512,167, dated January 2, 1894.

Application filed June 1, 1893. Serial No. 476,280. (Specimens.) Patented in England April 6, 1892, No. 6,630, and in France May 4, 1892, No. 221,373.

*To all whom it may concern:*

Be it known that I, THEODOR DIEHL, of Berlin, in the Kingdom of Prussia, German Empire, have invented new and useful Improvements in the Manufacture of Blue-Black Dyes, (for which I have obtained patents in England No. 6,630, dated April 6, 1892, and in France No. 221,373, dated May 4, 1892;) and I do hereby declare that the following is a full, clear, and exact description of the invention, which will enable others skilled in the art to which it appertains to make and use the same.

The invention relates to the production of azo-dyestuffs derived from para-amido-benzene-azoamido-alpha-naphtalin.

In Letters Patent No. 491,410, dated February 7, 1893, I have described coloring matters derived from the aforesaid diamidobase by combining the tetrazo-compound thereof with two molecules of para-amidonaphtol-monosulfoacid, alpha-naphtol-alpha-monosulfoacid or naphthionic acid. I have now discovered, that the para-amidobenzene-azo-amido-alpha-naphtalin may be gradually diazotized by the action of nitrite in such manner, that at first one of the two amido groups is transformed into a diazo group and that the diazo compound obtained in this way yields, when combined with one molecule of each of the afore mentioned acids valuable dyestuffs, having the following constitution:

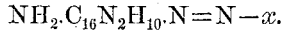

$$NH_2.C_{16}N_2H_{10}.N=N-x.$$

The following example will clearly show the manner of carrying out my invention: Twenty-six kilograms para-amidobenzene-azoamido-alphanaphtalin are dissolved in diluted hydrochloric acid and diazotized by the action of a solution of seven kilograms nitrite of soda. The deep orange colored solution of the diazocompound is poured into an alkaline solution of twenty-five kilograms para-amidonaphtolmonosulfoacid. A dark blue precipitate separates immediately; after stirring for some time the mixture is gently heated and a coloring matter, which is difficultly soluble, salted out completely, pressed and dried.

The dyestuff forms an amorphous black-brown powder, difficultly soluble in hot, more easily in cold water with black-blue color, which is not altered by the addition of caustic soda lye, an excess of the latter producing a blue-black precipitate. By adding mineral acids or acetic acid to the aqueous solution of the dyestuff the free color-acid separates in the shape of a blue-black precipitate, almost entirely insoluble in water or alcohol. The dyestuff dissolves sparingly in hot alcohol with dark-violet color. Concentrated sulfuric acid dissolves the dyestuff with an indigo-blue color; on diluting with water the solution turns at first violet-blue and then the free color acid is separated in the form of violet flakes.

The dyestuff dyes unmordanted cotton in an alkaline or neutral bath containing some common salt or Glauber's salt blue black; it may also be fixed on wool in a dye bath containing some salt, and produces a blue-black of great intensity. The color possesses a remarkable resistance against acids, and alkalies and withstands pretty well the action of air and light.

For the para-amidonaphtolmonosulfoacid I may substitute the alpha-naphtol-alpha-monosulfo acid or the naphthionic acid; the dyestuffs obtained in these cases give more black-violet shades.

Having now described my invention, what I claim is—

The blueblack dye, derived from the diazo compound of para-amido-benzene-azoamido-alphanaphtalin and paraamidonaphtolmonosulfoacid, said dye being soluble in water, sparingly soluble in alcohol, dissolving with indigoblue color in concentrated sulfuricacid, from which solution it is precipitated by water, substantially as set forth.

In testimony whereof I hereunto set my hand and affix my seal, in the presence of two witnesses, this 12th day of May, A. D. 1893.

THEODOR DIEHL. [L. S.]

Witnesses:
BERNHOLD SCHÖNBRODT,
GUSTAV LUCHT.